Feb. 13, 1962 A. J. GRANBERG ET AL 3,020,758
SPECIFIC GRAVITY RESPONSIVE LIQUID METER
Filed April 25, 1958 5 Sheets-Sheet 1

INVENTORS
ALBERT J. GRANBERG
ERIK THUSE
BY
Bruce & Brosler
THEIR ATTORNEYS

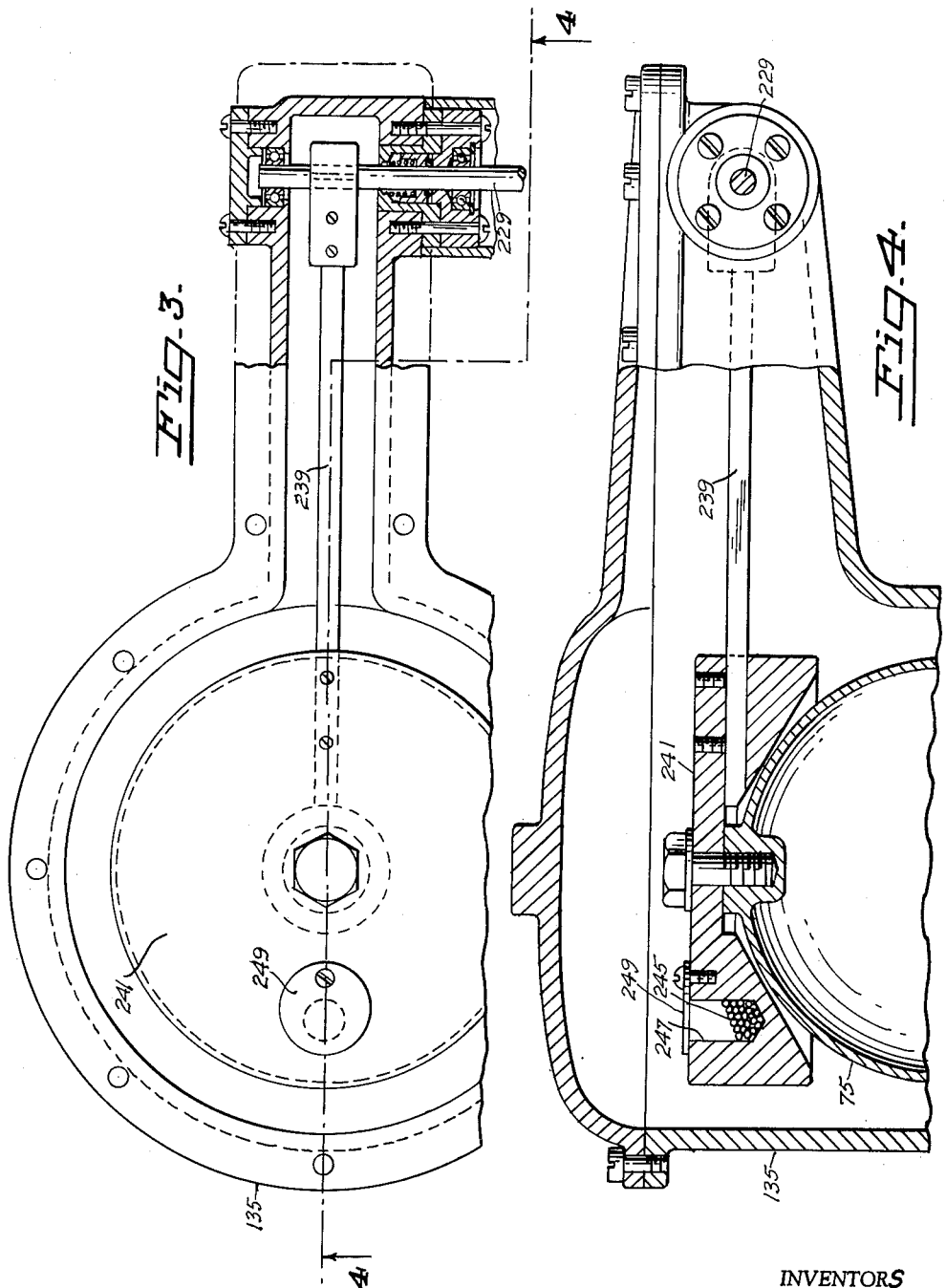

Feb. 13, 1962

A. J. GRANBERG ET AL 3,020,758

SPECIFIC GRAVITY RESPONSIVE LIQUID METER

Filed April 25, 1958

INVENTORS
ALBERT J. GRANBERG
ERIK THUSE
BY
Bruce & Brosler
THEIR ATTORNEYS.

Feb. 13, 1962

A. J. GRANBERG ET AL  3,020,758

SPECIFIC GRAVITY RESPONSIVE LIQUID METER

Filed April 25, 1958  5 Sheets-Sheet 5

INVENTORS
ALBERT J. GRANBERG
ERIK THUSE
BY

Bruce + Brosler

THEIR ATTORNEYS

United States Patent Office 3,020,758
Patented Feb. 13, 1962

3,020,758
SPECIFIC GRAVITY RESPONSIVE LIQUID METER
Albert J. Granberg and Erik Thuse, Oakland, Calif.; said Granberg assignor to Granberg Corporation, Oakland, Calif., a corporation of California
Filed Apr. 25, 1958, Ser. No. 730,960
4 Claims. (Cl. 73—194)

Our invention relates to liquid meters and more particularly to a liquid meter assembly for measuring liquid flow.

Ordinarily liquid meters are calibrated to measure liquid flow in terms of volume such as gallons. In many industries, however, it has become current and desirable practice to measure liquid flow in terms of its weight. This is particularly true in connection with aircraft and missiles where fuel load is based on the calculated consumption of fuel for a given trip in terms of pounds of fuel per hour, so as not to overload on takeoff and yet assure that the craft will carry the quantity necessary toward completing a specific flight.

All internal combustion engines are not designed to utilize fuel of the same specific gravity. The range of specific gravity in fuels may range from 32 A.P.I. all the way up to 60 A.P.I., certain engines being designed to operate on fuel of one specific gravity whereas others are designed to function with fuel of an entirely different specific gravity. It is uneconomical and highly impractical, however, to build meters which measure liquid flow of liquid of one specific gravity only.

Among the objects of our invention are:

(1) To provide a novel and improved liquid meter assembly capable of measuring liquid flow in terms of weight of liquid, and over a range of specific gravity;

(2) To provide a novel and improved liquid meter assembly which will measure liquid flow in terms of weight despite variations in specific gravity of liquid flowing through the meter component of such assembly;

(3) To provide a novel and improved liquid meter assembly for measuring liquid flow in terms of weight, which meter assembly embodies provisions for compensating for wear and tolerances in manufacture;

(4) To provide a novel and improved liquid meter assembly for measuring liquid flow in terms of weight of liquid, which meter assembly will correctly compensate for changes in specific gravity of the liquid despite reversal of flow of liquid through the meter component of such assembly;

(5) To provide a novel and improved liquid meter assembly capable of measuring liquid flow in terms of weight, the meter assembly being compensated to accurately adjust itself for variations in specific gravity of the liquid being metered and with a minimum load on the compensating means;

(6) To provide a novel and improved liquid meter assembly for measuring liquid flow in terms of weight of liquid, the meter assembly including means for compensating itself for variations in specific gravity of liquid flowing therethrough;

(7) To provide a novel and improved liquid meter assembly capable of measuring liquid flow in terms of weight and having included therewith, means for detecting variations in specific gravity of the liquid being metered;

(8) To provide a novel and improved liquid meter assembly including specific gravity compensating means for metering liquids in terms of actual weight, in which assembly, all of the liquid passes through the meter component of such assembly.

Additional objects of our invention will be brought out in the following description of a preferred embodiment of the same, taken in conjunction with the accompanying drawings, wherein FIG. 1 is a view in elevation, partly in section, of a meter assembly embodying the present invention;

FIG. 3 is an enlarged view, partly in section, of the component of FIG. 2, the cover of which has been removed;

FIG. 4 is a view in section, taken in the planes 4—4 of FIG. 3;

Figure 1:
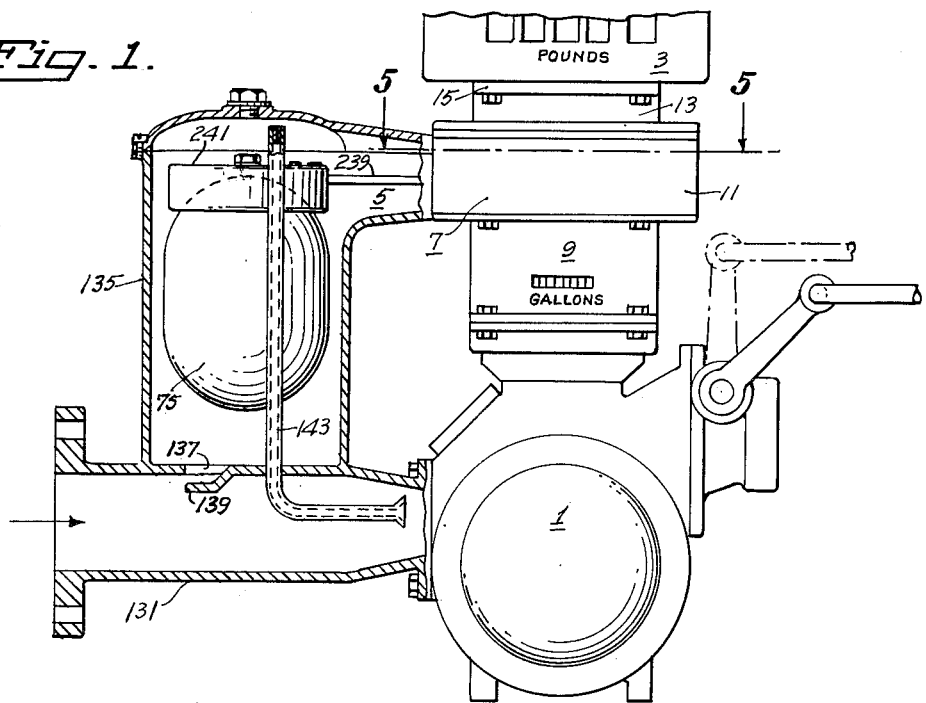
Figure 2:
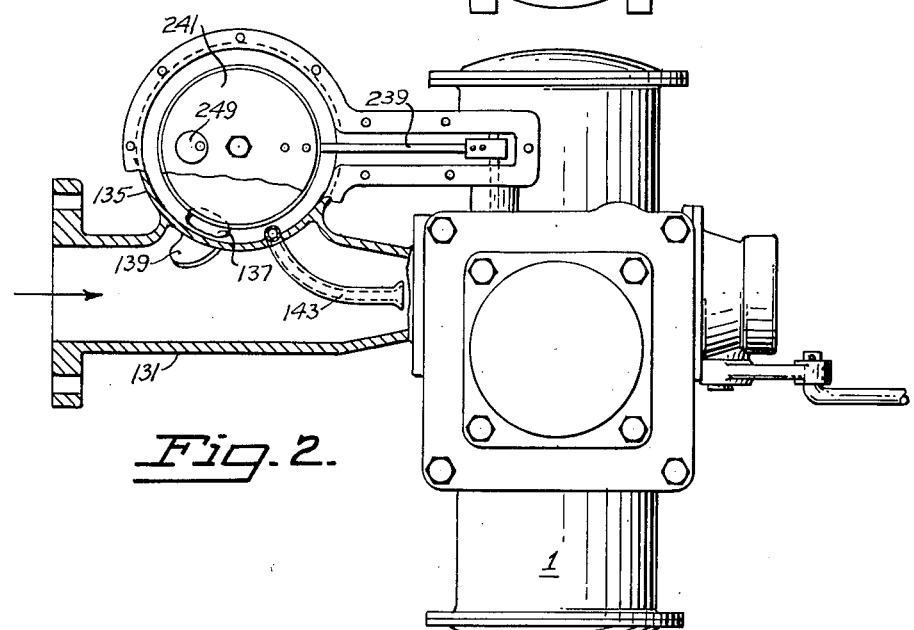
FIG. 2 is a plan view of the meter assembly of FIG. 1 with a cover of a component thereof removed.
Figure 5:
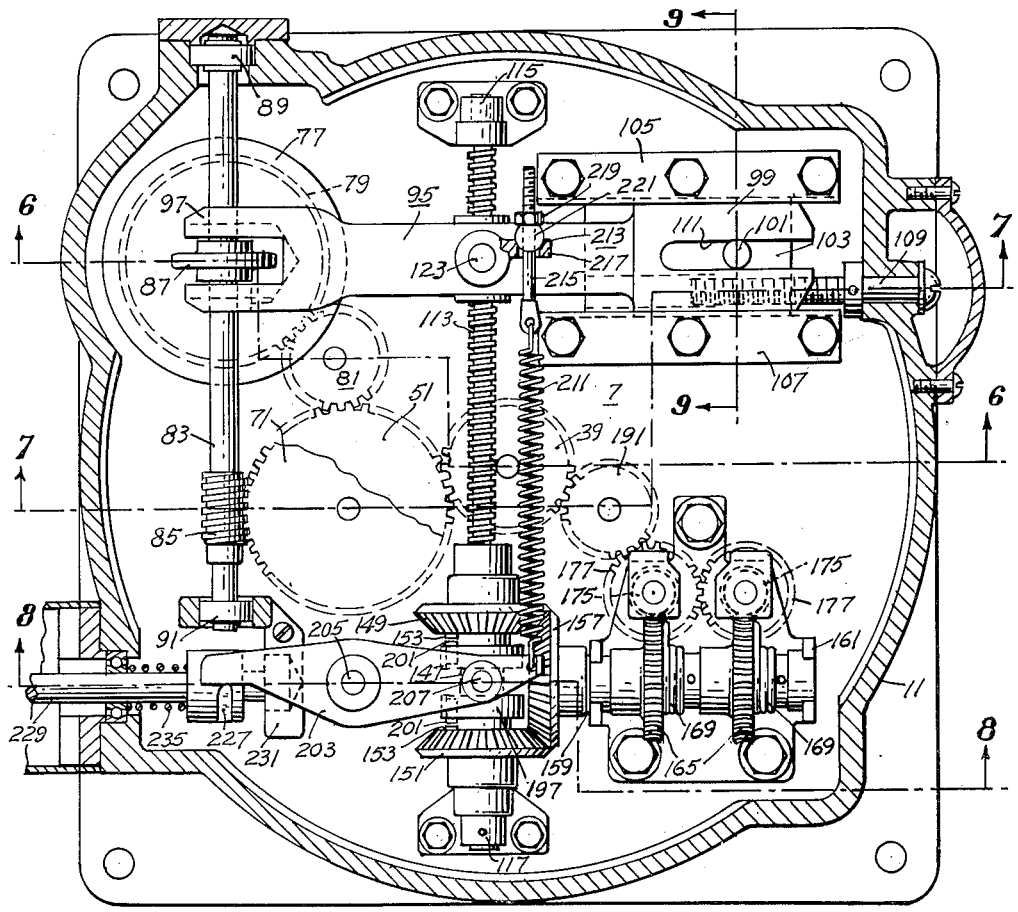
FIG. 5 is a view in section, taken in the plane 5—5 of FIG. 1.

Referring to the drawings for details of our invention in its preferred form, the meter assembly involves a liquid meter 1, a counter 3 calibrated in terms of pounds, a specific gravity compensating means 5, including a coupling section 7. An uncompensated counter 9 calibrated in terms of gallons, may be installed intermediate the meter 1 and coupling section 7.

The specific gravity compensating coupling section 7 includes a housing 11 which is adapted to be mounted on the upper end of the casing of the meter 1, or the intermediate uncompensated counter 9. The housing is preferably of cup shape, adapted to be closed at its open end by an intermediate coupling section 13 provided with an upper flange 15 to support the counter 3 which is preferably bolted thereto.

Figure 6:
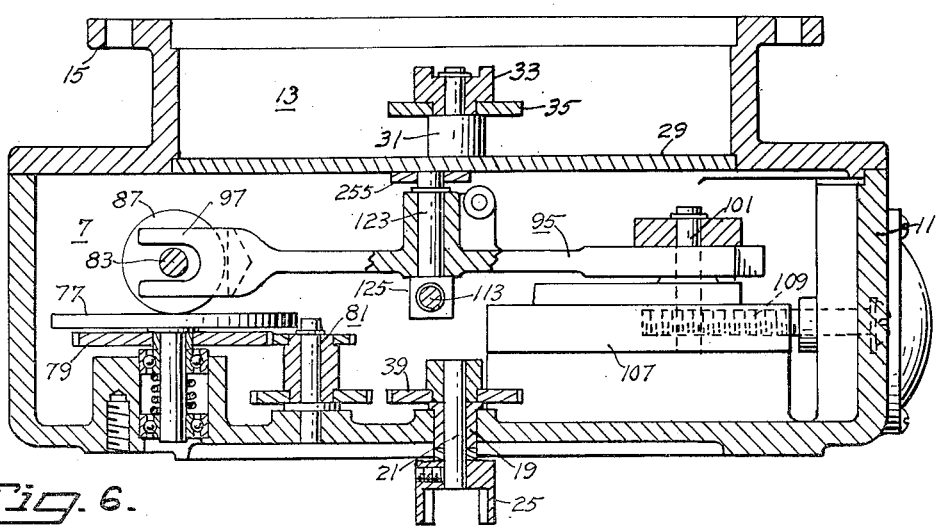
FIG. 6 is a view in section, taken in the planes 6—6 of FIG. 5.
Figure 7:
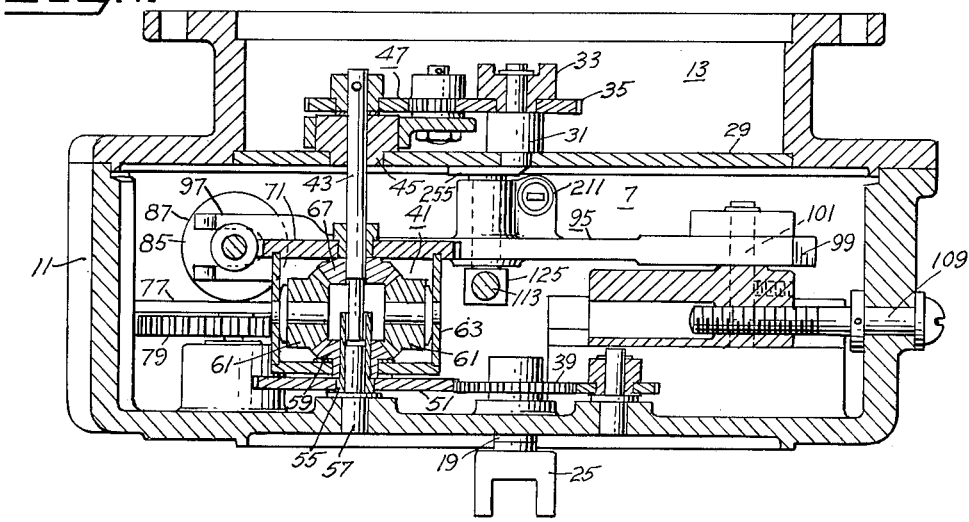
FIG. 7 is a view in section taken in the planes 7—7 of FIG. 5.
Figure 8:
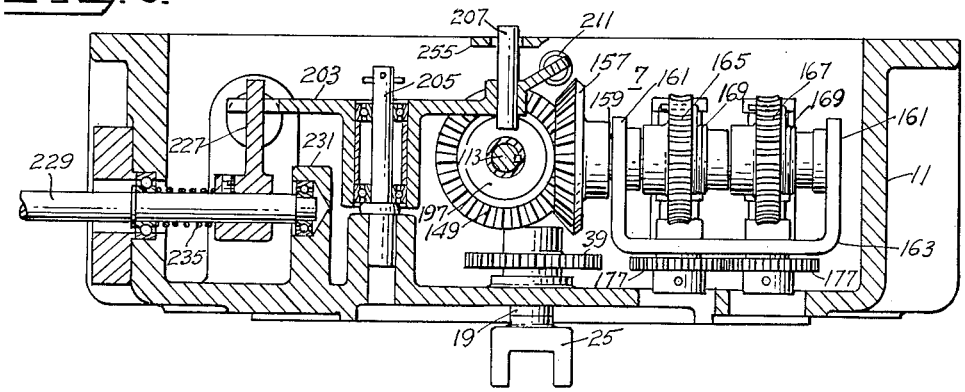
FIG. 8 is a view in section taken in the planes 8—8 of FIG. 5.
Figure 9:
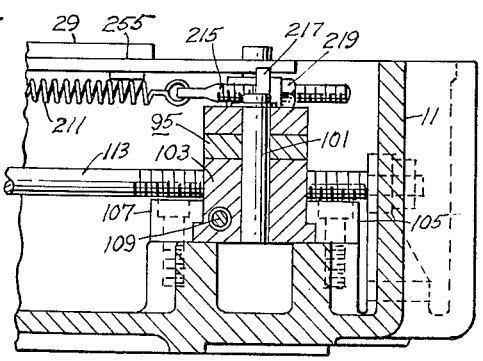
FIG. 9 is a view in section taken in the plane 9—9 of FIG. 5.
Figure 10:
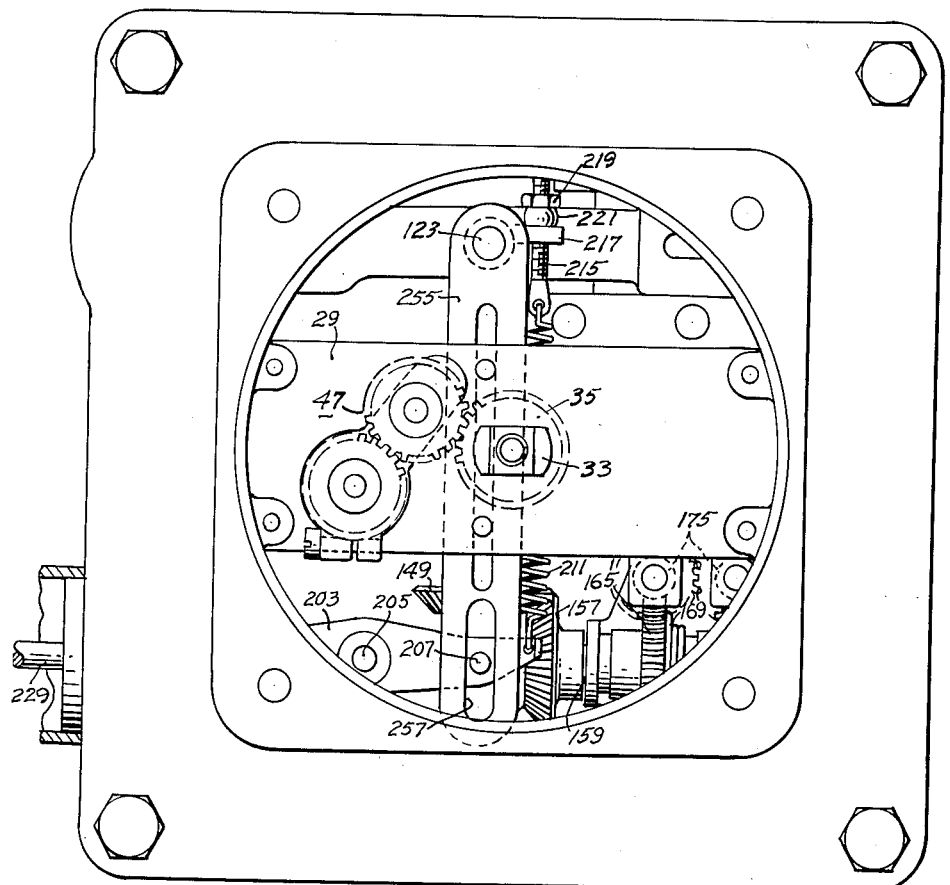
FIG. 10 is a plan view looking into the coupling section of the specific gravity compensating means of the present invention.

Journalled in a bushing 19 mounted centrally of the cup shaped housing, is a short coupling shaft 21 (FIG. 6) to the lower exposed end of which is a clutch element 25 for connection to a complementary clutch section (not shown) normally mounted on the upper end of the meter shaft which is driven by the meter, or the shaft of the intermediate counter 9 which in turn is driven by the meter.

Spanning the lower end of the auxiliary coupling section 13, is a plate 29, centrally of which is located a shouldered stud 31 which carries a rotatable clutch element 33 and aligned gear 35 affixed thereto. This latter clutch element is adapted to mesh with a complementary clutch element (not shown) mounted on the lower end of a counter shaft extending downward from the counter 3 mounted on the auxiliary coupling section 13. In the absence of any desired compensating action, a direct drive connection between the meter 1 and the counter 3 by way of the coupling shaft 21 driven by the meter, and the stud supported clutch element 33 would be in order.

The specific gravity compensating mechanism of the present invention provides for just such a direct drive between the meter 1 and the counter 3 when no specific gravity compensation is called for, as when the liquid flowing through the meter is of a specific gravity for which the meter is initially set.

Such direct coupling involves a gear 39 on the upper end of the coupling shaft 21 driving through a planetary gear arrangement 41 to a shaft 43 extending upwardly therefrom through a bushing 45 in the plate 29 which spans the lower end of the auxiliary coupling section 13, and from the upper end of this shaft, through a gear train 47 coupling the shaft 43 to the gear 35 affixed to the clutch element 33, which in turn couples to the counter shaft above.

The planetary gear arrangement involves a gear 51 meshing with the coupling shaft gear 39 and including a sleeve bearing 55 journalled on a stud 57 anchored in the floor of the cup shaped housing.

Affixed about the sleeve bearing and rotatable therewith is a bevel gear 59 meshing with a plurality of bevel planetary gears 61 rotatably fixed to the cylindrical wall of a gear housing 63 which itself is rotatably mounted at its bottom about the neck of the bevel gear 59.

The bevel planetary gears 61 in turn mesh with a sun gear 67 affixed to the lower portion of the shaft 43, the lower extremity of this shaft entering partly into the sleeve bearing 55 which serves to stabilize this end of the shaft.

A control gear 71 mounted about the neck of the sun gear 67 and affixed to the gear housing 63, provides means whereby the speed ratio through the planetary gear arrangement may be increased or decreased; and thus by rotating this control gear in one direction or the other in accordance with changes in specific gravity of liquid flowing through the meter, the response of the counter 3 may be altered accordingly.

Adjustable means is provided for establishing different rates and direction of rotation for this control gear 71, such adjustable means in turn being caused to respond to the action of a float 75 with changes in the specific gravity of liquid being metered.

The adjustable means referred to includes a rotatable disc 77 mounted on a gear 79 which is driven through a suitable gear train 81 from the gear 39 carried by the short coupling shaft 21, which means that the disc 77 will rotate in response to flow of liquid through the meter and will continue to so rotate as long as liquid flows.

The gear train 81 which drives the disc 77, includes the gear 51.

In conjunction with this disc, we provide a shaft 83 having a worm 85 at one end, a wheel 87 slidably affixed to the shaft, the shaft being rotatably journalled in suitable bearings 89, 91, with the worm 85 in drive connection to the control gear 71 of the planetary gear assembly, and the wheel 87 with its rim frictionally engaging the rotatable disc 77 at substantially the center thereof.

A wheel shifting lever 95 has one end 97 in straddling relationship to the wheel 87 while its other end 99 is provided with a fulcrum about which the lever may swing. This fulcrum is preferably made adjustable by utilizing as a fulcrum, a pin 101 anchored in a block 103 slidably supported between a pair of guide ways 105, 107 in which the block is adjustably shiftable by means of an adjusting screw 109 threadedly engaging the block and journalled in the wall of the housing. To provide for adjustment of the fulcrum with respect to the lever, the proximate end of the lever is provided with a slot or notch 111 to slidably receive the fulcrum pin 101.

Threadedly connecting with the lever at an intermediate point is an adjusting screw 113 journalled in bearings 115, 117. Rotation of this screw serves to swing the lever 95 in one direction or the other about its fulcrum 101 in accordance with the direction of rotation of such screw. With the shifting of such lever, the wheel 87 will be caused to shift from its central location on the rotatable disc 77, whereupon the resulting rotation of the wheel will cause rotation of its shaft 83 and a resulting rotation of the control gear 71. The direction and speed of rotation of this control gear will vary in accordance with the direction and extent of shift of the wheel with respect to the rotatable disc which it engages.

The threaded connection between the screw 113 and the lever 95 is preferably accomplished by a vertical pin 123 through the lever and carrying at its lower end a nut 125 through which the screw is threaded.

It will be apparent from the foregoing, that by suitable rotation of the screw in accordance with changes in specific gravity of liquid being metered, the desired speed changes may be introduced into the variable speed connection, which will accurately reflect such changes in specific gravity, in the readings recorded on the counter 3.

Accordingly, we provide means which will react to changes in specific gravity of the liquid to be metered and control operation of the screw 113 in accordance with such reactions. Such means in conjunction with the float 75, comprises a pipe section 131 for coupling into the main flow line of the liquid to the liquid meter 1, and to this pipe section is connected a float housing 135 to provide a chamber for the float.

A liquid flow connection between the pipe section 131 and the float housing 135 may be in the form of an opening 137 in the wall of the pipe section and from the edge of which extends downwardly into the pipe section against the normal direction of flow of liquid through the pipe section, a deflector 139. The function of this deflector is to deflect a portion of the main flow of liquid from the main flow line into the float housing to support the float 75 which will partly submerge in the liquid to a degree depending upon the specific gravity of such liquid.

To assure a continual change of the liquid in the float housing without turbulence, so that the degree of submergence of the float will always be in accordance with the specific gravity of the liquid flowing through the meter, a return flow path is provided preferably in the form of a tube 143 extending from the upper region of the float housing, back into the main flow path of the liquid to the meter. The entrance to this tube is preferably constricted to reduce flow through the float housing sufficiently to prevent disturbance of the float. Such tube also allows for escape of any entrapped air from the housing to assure adequate liquid in the housing for float operation.

In conjunction with the float 75, we provide in the coupling housing 11, reversible clutch means 147 in clutch relationship to the screw 113, for which purpose, this end of the screw is unthreaded to form a shank. Such reversible clutch means involves a pair of oppositely disposed bevel gears 149, 151 mounted for free rotation on the shank of the screw. Each of these bevel gears has a clutch tooth 153 extending from the face thereof. The bevel gears 149, 151 mesh with a drive gear 157 which in turn is driven by the liquid meter shaft. In effecting such drive connection, the drive gear 157 is mounted on the end of a shaft 159 supported for rotation in the ends 161 of a U-shaped supporting bracket 163. On this shaft are mounted a pair of worm gears 165, 167, each of which is similarly connected to the shaft by a one-way clutch drive connection utilizing a coil spring 169 having one end anchored to its associated gear and the other end in a one-way drive connection to the shaft, or in frictional contact therewith, whereby rotation of a worm gear in the direction of winding the spring, will tighten the frictional grip on the shaft, while a reverse rotation will loosen such grip. Thus either worm gear can drive the shaft, when rotated in the one and the same direction.

Each of the work gears 165, 167 meshes with and is driven by a worm 175 in line with a gear 177 which in turn mesh with each other and are rotated in series by means of a gear 191 connecting with the gear 39 on the shaft 21. Such series drive results in these two worm gears 165, 167 rotating in opposite directions, whereby only one of them can effect rotation of the bevel gear 157 when liquid flows through the meter in one direction, while the other functions should the liquid flow through the meter in the reverse direction, but regardless of which gear is effecting the drive, the bevel gear 157 will rotate in the same direction. The purpose of this drive arrangement is to maintain correct specific gravity compensation adjustment despite a reversal of flow of liquid through the meter.

Between the clutch gears 149, 151, a clutch element 197 is slidably keyed to the screw shank and adapted to be shifted from a neutral position, into engagement with either of the clutch gears. Such slidable element may take the form of a spool with cylindrical ends and a clutch tooth 201 extending from each end for engagement with the corresponding clutch tooth 153 for the proximate clutch gear.

Shifting of the clutch element 197 is accomplished through a lever 203 fulcrummed on a stub shaft 205 and carrying adjacent an end thereof, a clutch shift pin 207 which extends at one end down between the cylindrical ends of the slidable clutch element. This lever is normally exposed to a pull in one direction by a spring 211 anchored at one end to the end of the lever 203 supporting the clutch shift pin, and at its other end, under tension, to a spring adjustment 213 involving a threaded pin 215 passing through a holding arm 217 mounted on the nut supporting pin 123 which passes through the wheel shift lever, the pin 215 carrying an adjusting nut 219 against a ball stop 221 registering with the opening in the supporting arm.

In actuating engagement with the opposite end of the clutch shift lever 203 and in opposition to the pull of the spring 211 is a radial arm 227 fixedly mounted on a shaft 229 entering the cup shaped housing 11 from the outside and journalled in the wall thereof with one end of the shaft supported and journalled in an auxiliary wall 231 within the housing. A thrust spring 235 between the radial arm 227 and the wall of the housing, serves to stabilize the shaft 229 in its bearings, as well as the arm 227.

Operational movements of the clutch shift lever 203 are occasioned by angular movements of the arm 227 and the shaft on which it is mounted, and such angular movements are made responsive to reactions of the float 75 to changes in the specific gravity of the liquid in the float housing, by affixing to this shaft 229, a float arm 239 which extends into the float housing and connects to a cap 241 from which the float is suspended.

The apparatus as described above is initially adjusted for liquid of a particular specific gravity, and in making such adjustment, the wheel shift lever 95 is adjusted to center the wheel 87 on the disc 77, and the tension on the spring 211 is adjusted to bring the clutch shift pin 207 and associated clutch element 197 to neutral position.

If this leaves the float insufficiently submerged to permit of satisfactory response for variations in specific gravity in both the plus and minus directions, the float may be weighted by the addition of shot 245 which is provided for in the present instance by a recess 247 in the cap from which the float is suspended. At this recess, the cap is provided with a cover 249 to retain the shot against loss or displacement.

Following such weighting of the float, the tension of the spring 211 may have to be readjusted to bring the shiftable clutch element back into neutral position.

The adjustability of the fulcrum pin 101 by the adjusting screw 109 enables one to compensate with extreme accuracy, for inability to realize extreme precision with gears, and for wear.

Having properly adjusted the meter assembly for a particular specific gravity of liquid to be metered, the counter 3 will accurately record in terms of weight, liquid of this specific gravity flowing through the meter 1. Under these conditions, the sliding clutch element 197 will remain in neutral position and the wheel 87 will remain in contact with the disc 77 at its center. Consequently, the speed relationship between the meter shaft and the counter shaft will be that due to the direct drive through the planetary gear arrangement without any compensation.

Should a change in specific gravity occur in the liquid to be metered, the clutch shift pin 207 will be shifted in one direction or the other depending upon the direction of change of the specific gravity, and thus bring the shiftable clutch element 197 into drive engagement with the proper one of the opposing bevel gears 149, 151.

In effecting such engagement, not only will the screw 113 be set into rotation to produce the desired shift of the wheel shifting lever 95, but the tension in the spring 211 will be changed, that is either increased or decreased depending upon the direction of shift of the clutch element. The shift of the wheel shifting lever will be in the direction of restoring the spring to its original tension and such change in tension will continue until the slidable clutch element becomes disengaged and restored to neutral position. At this point, the tension in spring 211 will just counterbalance the action of the float on lever 203. The time interval involved in thus restoring the clutch element to its neutral position will vary with the extent to which the specific gravity of the liquid has changed from that for which the meter was originally set, and consequently the change in the variable speed connection will vary accordingly.

Upon completion of a fueling operation, it is conventional practice to drain the filling hose back through the meter to the supply tank. While the meter will reverse its rotation and subtract such liquid from the counter reading, the specific gravity compensation adjustment will not change due to the uni-directional drive to the bevel gear 157.

A compensated meter assembly of the type described above, for practical purposes, is preferably designed to compensate for only a portion of the entire specific gravity range which it is desired to cover. The present meter assembly is readily convertible from one portion of the range to another by merely substituting for the pair of gears in the gear train 47, a pair of gears of a different ratio.

To prevent the meter assembly from attempting to extend its operation beyond its assigned range, a shut-down feature is incorporated into the assembly. This may be accomplished by extending upwardly, both the nut supporting pin 123 of the wheel shift lever, and the clutch shift pin 207, connecting a limit bar 255 to the nut supporting pin and providing such bar with a slot 257 in which the clutch shift pin might move. During an interval in which a speed change adjustment is being made, this limit bar will move with the wheel shift lever, and so long as there is free movement between the limit bar and the clutch shift pin, the speed adjustment change will continue.

However, should the extent of adjustment of the wheel shift lever be such as to cause either end of the slot to reach the clutch shift pin, further movement of the wheel shift lever will cause the clutch shift element 197 to be either pushed or pulled out of engagement with respect to the drive element of the clutch with which it was in engagement. By giving to the slot 257 in the limit bar, a length such as will permit adjustment of the meter assembly over its assigned range of specific gravity changes, any tendency of the assembly to operate beyond such range will bring about disengagement of the clutch.

From the foregoing description of our invention in its preferred form, it will be apparent that the same not only fulfills all the objects of our invention, but is subject to modification and alteration without departing from the underlying principles involved, and we accordingly do not desire to be limited in our protection to the specific details illustrated and described except as may be necessitated by the appended claims.

We claim:

1. A specific gravity compensating means for coupling, in a liquid meter assembly, a liquid meter shaft and a counter shaft in a rotational speed relationship which will vary with change in specific gravity of a liquid being metered, said coupling means comprising a housing, a variable speed connection for installation between such meter shaft and such counter shaft and located in said housing, said variable speed connection including a planetary gear assembly having a control gear whose rotation will alter the speed relationship between such meter shaft and such counter shaft in accordance with the rate and direction of rotation thereof; adjustable means for establishing different rates and directions of rotation for said control gear, said adjustable means including a rotatable disc, means for continually rotating said disc in response to flow of liquid through a liquid meter, a shaft having a gear drive element and a wheel slidably mounted on said shaft, means shiftably supporting said wheel with its rim frictionally engaging said rotatable disc and with said gear drive element in meshing engagement with said control gear, said shiftable wheel supporting means including a lever at one end shiftably engaging said wheel and having a fulcrum about which said lever may swing, a fixedly mounted screw threadedly connecting with said lever and adapted when rotated in one direction to swing said lever in one direction about its fulcrum and when rotated in the reverse direction, to swing said lever in the opposite direction, said screw being adjusted to locate said wheel at the center of said disc for recording flow of liquid of a certain specific gravity; and means responsive to changes in specific gravity of liquid to be metered and operating through said screw for altering rotation of said control gear in accordance with such changes in specific gravity of liquid to be metered, said specific gravity responsive means comprising a pipe section for coupling in the main flow line to a liquid meter, a float housing connected to the wall of said pipe section to form a float chamber, said pipe section having a flow connection into said chamber and means for deflecting a portion of such flow into said float housing, a return flow connection for liquid extending from the upper region of said chamber and terminating in the flow path of liquid to be metered, a float in said float housing, reversible clutch means in said coupling housing in clutch relationship to said screw, said reversible clutch means including a pair of rotatable elements, means actuable by liquid flow through a meter for rotating said elements in opposite directions, a clutch element in drive connection with said screw and slidable from a neutral position into engagement with either one or the other of said rotatable elements, means coupled to said float for shifting said clutch element in accordance with changes in both extent and direction in the specific gravity liquid in said float housing from a predetermined value of specific gravity, to cause rotation of said screw and resulting swing of said lever, and means responsive to such swing of said lever for restoring said clutch element to neutral position upon said lever reaching a swing position proportional to the change in specific gravity which produced it.

2. A specific gravity compensating means for coupling, in a liquid meter assembly, a liquid meter shaft and a counter shaft in a rotational speed relationship which will vary with change in specific gravity of a liquid being metered, said coupling means comprising a housing, a variable speed connection for installation between such meter shaft and such counter shaft and located in said housing, said variable speed connection including a planetary gear assembly having a control gear whose rotation will alter the speed relationship between such meter shaft and such counter shaft in accordance with the rate and direction of rotation thereof; adjustable means for establishing different rates and direction of rotation for said control gear, said adjustable means including a rotatable disc, means for continually rotating said disc in response to flow of liquid through a liquid meter, a shaft having a gear drive element and a wheel slidably mounted on said shaft, means shiftably supporting said wheel with its rim frictionally engaging said rotatable disc and with said gear drive element in meshing engagement with said control gear, said shiftable wheel supporting means including a lever at one end shiftably engaging said wheel and having a fulcrum adjacent its other end, a fixedly mounted screw threadedly connecting with said lever at an intermediate point thereof, and adapted when rotated in one direction to swing said lever in one direction about its fulcrum and when rotated in the reverse direction, to swing said lever in the opposite direction, said screw being adjusted to locate said wheel at the center of said disc for recording flow of liquid of a certain specific gravity, and means responsive to changes in specific gravity of liquid to be metered and operating through said screw for altering rotation of said control gear in accordance with such changes in specific gravity of liquid to be metered, said specific gravity responsive means comprising a pipe section for coupling in the main flow line to a liquid meter, a float housing connected to the wall of said pipe section to form a float chamber, said pipe section having a flow connection into said chamber and means for deflecting a portion of such flow into said float housing, a return tube for liquid extending from the upper region of said chamber and terminating in the flow path of liquid to be metered, a float in said float housing, reversible clutch means in said coupling housing in clutch relationship to said screw, said reversible clutch means including a pair of elements rotatable in opposite directions, a clutch element in drive connection with said screw and slidable from a neutral position into engagement with either one or the other of said rotatable elements, means coupled to said float for shifting said clutch element in accordance with changes in both extent and direction in the specific gravity of liquid in said float housing from a predetermined value of specific gravity, to cause rotation of said screw and resulting swing of said lever, and means responsive to such swing of said lever for restoring said clutch element to neutral position upon said lever reaching a swing position proportional to the change in specific gravity which produced it.

3. A specific gravity compensating means for coupling, in a liquid meter assembly, a liquid meter shaft and a counter shaft in rotational speed relationship which will vary with change in specific gravity of a liquid being metered, said coupling means comprising a cup shape housing, a variable speed connection for installation between such meter shaft and such counter shaft and located in said housing, said variable speed connection including a planetary gear assembly having a control gear whose rotation will alter the speed relationship between such meter shaft and such counter shaft in accordance with the rate and direction of rotation thereof; adjustable means for establishing different rates and direction of rotation for said control gear, said adjustable means including a rotatable disc, means for continually rotating said disc in response to flow of liquid through a liquid meter, a shaft having a worm and a wheel slidably mounted on said shaft, means shiftably supporting said wheel with its rim frictionally engaging said rotatable disc and with said worm in meshing engagement with said control gear, said shiftable wheel supporting means including a lever at one end straddling said wheel and having an adjustable fulcrum adjacent its other end, a fixedly mounted screw threadedly connecting with said lever at an intermediate point thereof, and adapted when rotated in one direction to swing said lever in one direction about its fulcrum and when rotated in the reverse direction, to swing said lever in the opposite direction, said screw being adjusted to locate said wheel at the center of said disc for recording flow of liquid of a certain specific gravity; and means responsive to changes in specific gravity of liquid to be metered and operating through said screw for altering rotation of said control gear in accordance with such changes in specific gravity of liquid to be metered, said specific gravity responsive means comprising a pipe section for coupling in the main flow line to a liquid meter, a float housing connected to the wall of said pipe section to form a float chamber, said pipe section having an opening into said chamber and a deflector extending into said pipe section from the edge of said opening against the normal direction of flow of liquid through said pipe section, whereby to deflect a portion of such flow into said float housing, a return tube for liquid extending from the upper region of said chamber and terminating in the flow path of liquid to be metered, a float in said float housing, reversible clutch means in said cup shape housing in clutch relationship to said screw, said reversible clutch means including a pair of rotatable elements, means actuable by liquid flow through a meter for rotating said elements in opposite directions, a clutch element in drive connection with said screw and slidable from a neutral position into engagement with either one or the other of said rotatable elements, means coupled to said float for shifting said clutch element in accordance with changes in both extent and direction in the specific gravity of liquid in said float housing from a predetermined value of specific gravity, to cause rotation of said screw and resulting swing of said lever, and means responsive to such swing of said lever for restoring said clutch element to neutral position upon said lever reaching a swing position proportional to the change in specific gravity which produced it.

4. A specific gravity compensating means for coupling, in a liquid meter assembly, a liquid meter shaft and a counter shaft in a rotational speed relationship which will vary with change in specific gravity of a liquid being metered, said coupling means comprising a drive connection for installation between such meter shaft and such counter shaft, adjustable means for establishing different rates and direction of rotation for said drive connection, said adjustable means including a rotatable disc, means for continually rotating said disc in response to flow of liquid through a liquid meter, a shaft having a wheel slidably mounted thereon, means shiftably supporting said wheel with its rim frictionally engaging said rotatable disc, said shiftably supporting means including a lever at one end shiftably engaging said wheel and having a fulcrum, a fixedly mounted screw threadedly connecting with said lever and adapted when rotated in one direction to swing said lever in one direction about its fulcrum and when rotated in the reverse direction, to swing said lever in the opposite direction, said screw being adjusted to locate said wheel at substantially the center of said disc for recording flow of liquid of a certain specific gravity; and means responsive to changes in specific gravity of liquid to be metered and operating through said screw for altering said drive connection in accordance with such changes in specific gravity of liquid to be metered, said specific gravity change responsive means comprising a pipe section for coupling in the main flow line to a liquid meter, a float housing connected to said pipe section to form a float chamber, a return tube for liquid extending from said chamber and terminating in the flow path of liquid to be metered, a float in said float housing, reversible clutch means in clutch relationship to said screw, said reversible clutch means including a pair of rotatable elements, means actuable by liquid flow through a meter for rotating said elements in opposite directions, a clutch element in drive connection with said screw and slidable from a neutral position into engagement with either one or the other of said rotatable elements, means coupled to said float for shifting said clutch element in accordance with changes in both extent and direction in the specific gravity of liquid in said float housing from a predetermined value of specific gravity, to cause rotation of said screw and resulting swing of said lever, and means responsive to such swing of said lever for restoring said clutch element to neutral position upon said lever reaching a swing position proportional to the change in specific gravity which produced it.

References Cited in the file of this patent

UNITED STATES PATENTS

| | | |
|---|---|---|
| 2,312,105 | Liebrecht | Feb. 23, 1943 |
| 2,312,944 | Voller et al. | Mar. 2, 1943 |
| 2,348,593 | Beitler | May 9, 1944 |
| 2,438,934 | Marsh | Apr. 6, 1948 |
| 2,791,118 | Holtz | May 7, 1957 |
| 2,886,969 | Dufour | May 19, 1959 |